United States Patent [19]

Trantham et al.

[11] 4,085,797
[45] Apr. 25, 1978

[54] PROGRESSIVE DISPLACEMENT OF RESIDUAL WATER PAST SHUT-IN WELLS PREPARATORY TO TERTIARY OIL RECOVERY

[75] Inventors: Joseph C. Trantham, Bartlesville, Okla.; Robert F. Meldau, Santa Maria, Calif.

[73] Assignee: Phillips Petroleum Company, Bartlesville, Okla.

[21] Appl. No.: 752,951

[22] Filed: Dec. 22, 1976

[51] Int. Cl.² ............................................. E21B 43/22
[52] U.S. Cl. ................................... 166/245; 166/263; 166/273
[58] Field of Search ............... 166/273, 274, 245, 263, 166/252

[56] References Cited

U.S. PATENT DOCUMENTS

| 3,120,870 | 2/1964 | Santourian | 166/245 |
| 3,199,587 | 8/1965 | Santourian | 166/245 |
| 3,343,597 | 9/1967 | Gogarty et al. | 166/273 |
| 3,362,473 | 1/1968 | Foster | 166/273 |
| 3,369,602 | 2/1968 | Fallgatter et al. | 166/273 |
| 3,380,526 | 4/1968 | Altamira et al. | 166/245 |
| 3,386,504 | 6/1968 | Kunetka | 166/245 |
| 3,478,823 | 11/1969 | Murphy | 166/274 |
| 3,482,631 | 12/1969 | Jones | 166/273 |
| 3,500,922 | 3/1970 | O'Brien et al. | 166/273 |
| 3,872,922 | 3/1975 | Altamira et al. | 166/245 |

OTHER PUBLICATIONS

Uren, Petroleum Production Engineering, Oil Field Exploitation, 3rd Ed., McGraw-Hill Book Co., Inc., N.Y., N.Y., 1953, pp. 528-532.

Primary Examiner—Stephen J. Novosad

[57] ABSTRACT

In the oil-bearing formation wherein primary production has been exhausted and secondary recovery by waterflooding is exhausted or about exhausted, the residual brine is removed by progressive displacement. In this displacement a centrally disposed injection well or, preferably, lineal injection wells are utilized for the initial injection of preflush fluid with the immediately adjacent production and/or injection wells being shut in. After a specified slug of preflush has been injected, a series of chemical slugs is injected followed by drive fluid. After displacement of the residual brine has been effected out past the adjacent shutin wells, as evidenced by the arrival of the preflush, they are utilized as production wells. After oil sweep to these wells is complete, they are used as injection wells and the procedure is moved another step outward.

10 Claims, 2 Drawing Figures

-o- INJECTOR
• PRODUCER
o SHUT-IN WELL
SD
⋮⋮⋮ PREFLUSH
⦸ SURFACTANT
⋰⋰ POLYMER SOLUTION
▩ DRIVE

- ⊸— INJECTOR
- • PRODUCER
- ∘ SHUT-IN WELL
- SD
- ░ PREFLUSH
- ▨ SURFACTANT
- ⊞ POLYMER SOLUTION
- ▩ DRIVE

PROGRESSIVE DISPLACEMENT OF RESIDUAL WATER PAST SHUT-IN WELLS PREPARATORY TO TERTIARY OIL RECOVERY

BACKGROUND OF THE INVENTION

This invention relates to tertiary oil recovery.

It has long been known that after primary oil recovery is exhausted, additional oil can be obtained by secondary recovery wherein a fluid is injected into certain wells and oil is produced from other wells. Various techniques such as a five-spot system wherein fluid is injected into a central well and oil is produced from four surrounding wells, or vice versa, are well known. Also known are sequential systems employing seven spots as described in U.S. Pat. No. 3,120,870.

However, during the injection of preflush prior to beginning a tertiary oil recovery operation, no significant amount of oil is being produced. Hence it is essential to keep the preflush injection as brief as possible.

After secondary recovery is complete and little or no more oil can be produced thereby, there is still a great deal of oil remaining in the ground. It is known to remove part of this unrecovered oil by tertiary recovery wherein a microemulsion bank or a surfactant solution is injected through the same wells used in the secondary recovery. As yet, tertiary recovery has achieved only limited commercial success because of the cost of the ingredients; particularly in the microemulsion flooding, relatively expensive alcohols and petroleum sulfonates are required and there is a tendency for the petroleum sulfonate to be lost due to adsorption, or destruction by divalent cations in the residual formation water. Thus, in order to get the most efficient utilization of the expensive surfactants, it is necessary to displace the residual formation water which may contain a high TDS (greater than 50,000 parts per million total dissolved solids) and/or high concentration of divalent cations, with a medium compatible with the tertiary recovery fluid. The divalent cations form oil soluble salts with the sulfonate and these salts are not effective in oil displacement.

Unfortunately, it has been found that the use of the techniques developed for injecting brine in secondary recovery operations are not very efficient for injecting the preflush to displace the residual formation water. This is because the preflush tends to form cusps and break through to the production wells after about 70 to 72% of the pore volume has been flushed. This breakthrough of the preflush fluid directly from the injection well to the production well makes this technique uneconomical. Of course, the same thing happens in secondary recovery by means of waterflooding; however, this can be tolerated since, after breakthrough occurs, continued injection of the brine results in the production of a mixture of oil and drive water until most of the pore volume has been swept, and the continuous recovery of an increment of oil makes the procedure economically feasible.

SUMMARY OF THE INVENTION

It is an object of this invention to facilitate economical use of tertiary oil recovery compositions; and It is a further object of this invention to achieve high efficiency in displacing residual formation water from oil fields which have been subjected to secondary recovery operations.

In accordance with this invention, a preflush fluid is injected through a first well, or wells, and formation brine produced from wells separated from said first injection well, or wells, by wells which have been shut in, so as to remove residual formation fluid from a prior secondary recovery operation.

BRIEF DESCRIPTION OF THE DRAWINGS

In the drawings, forming a part hereof.

DESCRIPTION OF THE PREFERRED EMBODIMENTS

Figure 1:
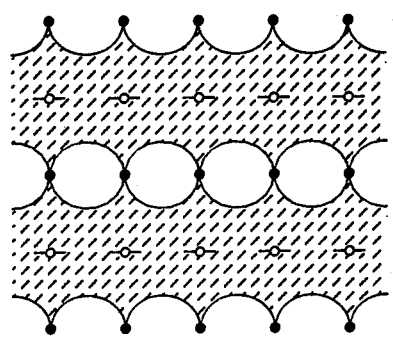
FIG. 1 is a schematic representation of an oil field having line spacing for injection of fluid in accordance with the known procedures of the prior art for secondary oil recovery by means of waterflooding.

Referring to FIG. 1, there is shown a typical line drive oil well pattern such as is used for conventional waterflooding. As can be seen, the brine is introduced through the injector wells shown by the open circles and oil is recovered from the producing wells depicted by the solid dots. However, as is shown by the shaded area, the brine tends to form cusps, penetrating quickly to the producing wells thus leaving about 28 to 30% of the area which is not initially swept by the brine bank. This type of injection spacing was tested for injecting preflush to sweep out residual formation water, and it was found the same type of cusping occurred with breakthrough of the preflush after less than 72% of the pore volume had been contacted.

Figure 2:
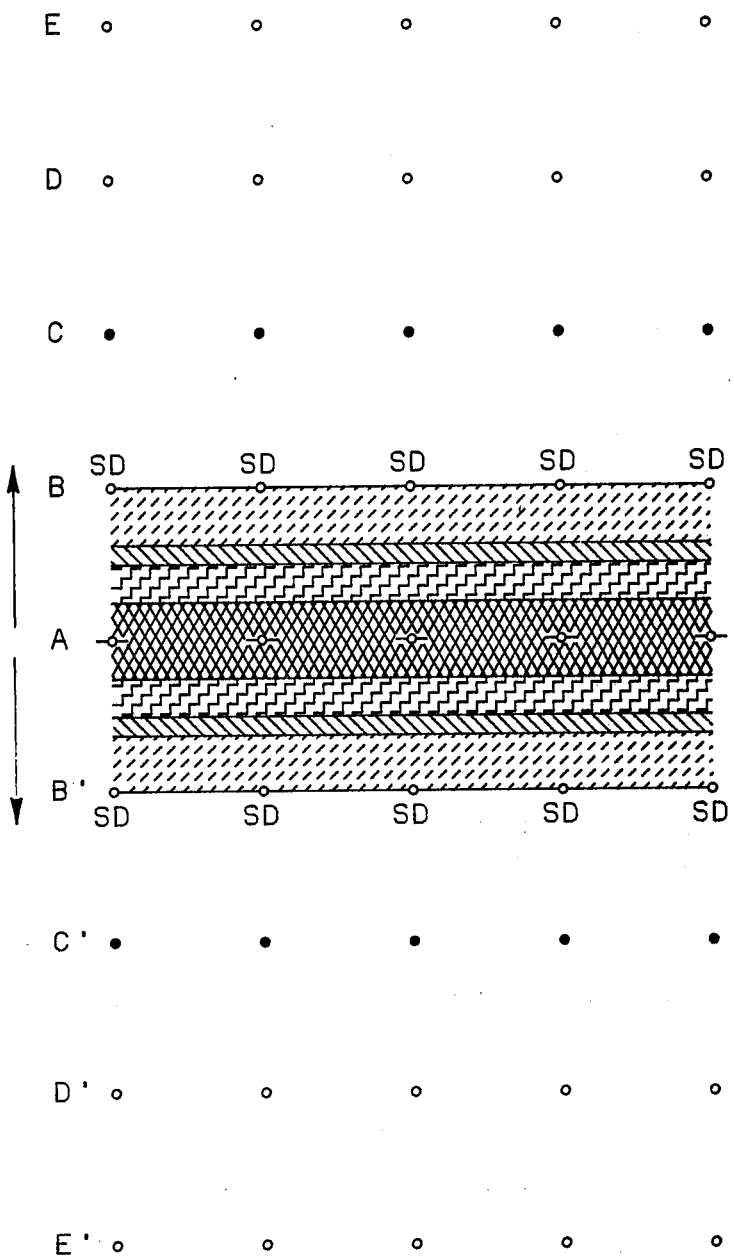
FIG. 2 is a schematic representation of a similar field using the sequence of this invention.

As can be seen from FIG. 2 depicting the invention at a point near the end of the first sequence of steps. With lines B and B' shut in, preflush is injected through the wells in line A until an amount preferably equal to about 40% of the pore volume between lines B and B' has been filled with the preflush. During this preflush injection formation, fluid is recovered from the wells at lines C and C'. The preflush is followed by the chemical (surfactant, microemulsion, etc.) slug followed by a mobility buffer and finally drive fluid. During this time, formation water continues to be produced at C and C'. When the preflush bank has swept the area between B and B', as evidenced by stabilized preflush content at these lines as evidenced by production tests, production is begun at the previously shut in wells along line B and B' until all of the areas between A and B, and A and B' are depleted of oil. Thereafter line A is shut in and the whole sequence started over by injecting preflush at lines B and B' until about 40% of the pore volume between B and C and between B' and C' has been injected with lines C and C' shut in and formation fluid being produced at lines D and D'. The preflush is followed by the chemical slug, buffer fluid and drive as before. When production tests at C and C' show a stabilized preflush content, production is begun at C and C' until the areas between B and C, and B' and C' are depleted of oil. Thereafter, B and B' are shut in, the injection is moved to C and C', and the steps repeated as above, the injection lines being moved away from the starting point at line A until the entire reservoir has been depleted of oil.

The shut in lines A, and later B, B', etc., can be maintained under slight pressure so as to maintain the pressure in the central portion of the field. It is preferred that the production wells be separated from the injection well or wells during injection of the preflush by at least one shut in well or line or wells as shown in FIG. 2, although any number of shut in wells can separate the injection well or wells from the production well so long as there is at least one. In addition to the line drive pattern shown, the invention can be employed in a five-spot pattern to drive the fluids radially outward to surrounding wells. Also the line drive can be started at one or both ends of a reservoir and moved toward the other end or middle, respectively. The primary purpose of the preflush injection is to replace the residual formation water, particularly that containing high total dissolved solids, (greater than 50,000 parts per million) and/or a high concentration of divalent cations, dissolved solids attributable to divalent cations of greater than 4,000 parts per million are particularly undesirable. However, in most instances, a little oil will also be produced along with the brine.

The conversion of producing wells to temporary injection wells simply involves removing the pump, and installing a high pressure pipe with a packer which goes in the annulus between the high pressure pipe and the casing to the top of the pay so that the preflush can be confined to the pay.

The preflush is introduced in an amount within the range of 0.2 to 1, preferably 0.3 to 0.5, pore volumes. As noted hereinabove, only about 70 or 72% of the area is swept utilizing the conventional five-spot injection system and it would take a volume of preflush equal to several times the total pore volume to ultimately sweep the entire formation utilizing conventional techniques with production of nearest offset wells. In accordance with the invention, most of the undesirable residual formation water can be removed with less than one pore volume, generally less than one/half pore volume, of preflush fluid because part of the pore volume is still occupied by oil, and because there is essentially no bypassing of the preflush directly to the close-in production wells that have been shut in, and thus the preflush can be moved along as a bank followed by the tertiary recovery fluid.

The preflush which is utilized to displace the residual formation of water is a material which is compatible with the tertiary recovery fluid to be utilized, preferably a preflush compatible with a surfactant flood or a microemulsion flood. Most preferably, it is material which is compatible with a sulfonate-containing microemulsion. Suitable tertiary systems in accordance with the preferred embodiment are those containing a petroleum sulfonate surfactant, a cosurfactant such as a lower alcohol, and a brine solution, preferably of sodium chloride, containing 2,000 – 50,000 parts per million total dissolved solids. Preferred petroleum sulfonates are those having an average equivalent weight within the range of 375 to 500, preferably 400 – 450. These sulfonates are well known in the art and are sometimes referred to as petroleum mahogany sulfonates. Generally, these sulfonates contain one monovalent cation, which may be any of the alkali metals or the ammonium ion. The cosurfactant can be any alcohol, amide, amine, ester, aldehyde, or ketone containing 1 to 20 carbon atoms and having a solubility in water within the range of 0.5 to 20, preferably 2 to 10, grams per 100 grams of water. Preferred materials are the $C_4$ to $C_7$ alkanols or mixtures thereof. Isobutyl alcohol with the solubility of 9.5 grams per 100 grams of water is particularly suitable. Other preferred cosurfactants include secondary butyl alcohol and isoamyl alcohol.

The brine constitutes 85 to 95% of the total composition including brine, surfactant, and cosurfactant. The brine is made up of water and an electrolyte which is generally predominantly sodium chloride. The electrolyte is present in the water in an amount within the range of 2,000 to 50,000, preferably 10,000 to 20,000, parts per million. Other electrolytes which may be used in minor amounts in combination with the sodium chloride include potassium chloride, sodium sulfate, ammonium chloride, and the like.

The sulfonate is generally present in an amount within the range of 3 to 12, preferably 4 to 8, weight percent based on the weight of the water. The cosurfactant is utilized in an amount within the range of 1 to 12, preferably 3 to 9, weight percent based on the weight of water.

The microemulsion or other tertiary recovery fluid is injected in an amount within the range of 4 to 20% of pore volume. After the residual formation water removal has begun in accordance with this invention, and the microemulsion or surfactant system injected, a mobility buffer is injected behind the surfactant system as is well known in the art. Suitable mobility buffers include high molecular weight partially hydrolyzed polyacrylamides, polysaccharides, soluble cellulose ethers, and the like. Finally, a drive fluid is injected behind the mobility buffer to force the remaining oil contained in the reservoir toward the recovery well. Drive material can be an aqueous or nonaqueous fluid as is well known in the art. Generally, it is formation water or water similar thereto.

CONTROL 15,000 parts per million sodium chloride brine was introduced into the central well in a five-spot pattern oil field which had been subjected to secondary recovery for the purpose of displacing the residual formation water, which had a total dissolved solids content of 88,000 parts per million including a substantial amount of divalent cations. Breakthrough of the preflush to the production wells occurred before 72% areal sweep efficiency. In an idealized situation of completely homogeneous sand breakthrough occurs when 72% of the formation has been areally swept by the flooding material, but in a normal situation breakthrough to the producing wells occurs when less than 72% of the formation has been swept by the flooding mediums.

CALCULATED ILLUSTRATIVE EMBODIMENT

In an oil field such as that of the control, one line of injection wells is utilized to inject a preflush comprising 15,000 parts per million sodium chloride solution with the surrounding lines of wells being shut in. After 0.4 pore volume of preflush is injected, a surfactant system and thereafter a modified buffer and drive fluid are injected. Fluid is injected until the preflush sweep reaches the first line of shut in wells as shown in FIG. 2. Thereafter, these shut in wells are converted to production wells. After production is complete, additional lines of wells are shut in with production being taken from the wells spaced further apart from these new injection wells. This results in essentially a 100% sweep efficiency with a pore volume of preflush of only 0.4.

While this invention has been described in detail for the purpose of illustration, it is not to be construed as limited thereby but is intended to cover all changes and modifications within the spirit and scope thereof.

We claim:

1. A method comprising:

injecting a preflush fluid through at least one injection well into an underground formation in an oil field having a plurality of wells around said injection well, which oil field has been subjected to a water flood recovery operation;

producing formation fluid from at least one production well spaced apart from said injection well by at least one shut in well located between said at least one injection well and said at least one production well;

thereafter injecting a chemical fluid through said at least one injection well;

thereafter injecting drive fluid through said at least one injection well;

keeping said at least one shut in well shut in until said preflush fluid reaches said at least one shut in well;

thereafter opening said at least one shut in well and recovering oil therefrom; and after oil between said at least one injection well and said thus opened at least one shut in well has been essentially depleted, converting said thus opened well to a new preflush injection well, shutting in said at least one injection well and repeating the above steps at wells spaced further apart from said at least one injection well.

2. A method according to claim 1 wherein said preflush fluid is water containing 10,000 to 20,000 parts per million sodium chloride.

3. A method according to claim 2 wherein said preflush fluid is introduced in an amount within the range of 0.3 to 0.5 pore volumes.

4. A method according to claim 3 wherein said chemical fluid is a surfactant system or microemulsion.

5. A method according to claim 4 wherein said surfactant system is made up of a petroleum sulfonate, a cosurfactant, and a brine solution containing 2,000 to 50,000 parts per million sodium chloride.

6. A method according to claim 1 wherein said preflush fluid is water containing 10,000 to 20,000 parts per million sodium chloride introduced in an amount within the range of 0.3 to 0.5 pore volume.

7. A method according to claim 1 wherein said at least one first injection well comprises a line of injection wells and said at least one shut in well comprises a line of wells on each side of said line of first injection wells.

8. A method according to claim 1 wherein said at least one shut in well comprises a plurality of shut in wells in an annular configuration around said first injection well.

9. A method according to claim 1 wherein said formation fluid contains greater than 50,000 parts per million total dissolved solids and said preflush contains 10,000 to 20,000 parts per million sodium chloride.

10. A method according to claim 1 wherein a mobility buffer is introduced between said chemical fluid and said drive fluid.

* * * * *